US011157388B1

(12) United States Patent
Baker et al.

(10) Patent No.: US 11,157,388 B1
(45) Date of Patent: Oct. 26, 2021

(54) TRACE IDENTIFICATION BASED ON WAIT CHAIN COVERAGE ANALYSIS

(71) Applicant: Microsoft Technology Licensing, LLC, Redmond, WA (US)

(72) Inventors: Scotia Clover Baker, Duvall, WA (US); Ilia Sacson, Renton, WA (US); Deepthi Sri Dhulipalla, Redmond, WA (US); James Christopher Gray, Redmond, WA (US); Manikanta Reddy Dornala, Bellevue, WA (US); Minxiao Zhou, Bellevue, WA (US); Travis Alcantara, Seattle, WA (US); Yash Sharma, Kirkland, WA (US); Vibhor Bhatt, Bellevue, WA (US); Qi Zhang, Redmond, WA (US); Ishfaq Mohammad Ismail, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/925,904

(22) Filed: Jul. 10, 2020

(51) Int. Cl.
*G06F 11/36* (2006.01)

(52) U.S. Cl.
CPC ........ *G06F 11/364* (2013.01); *G06F 11/3612* (2013.01)

(58) Field of Classification Search
CPC .............................. G06F 11/364; G06F 11/3612
See application file for complete search history.

(56) References Cited

U.S. PATENT DOCUMENTS

| 7,603,546 B2* | 10/2009 | Narayanasamy | ....... G06F 8/451 713/1 |
| 8,464,221 B2 | 6/2013 | Zheng et al. | |
| 9,189,233 B2* | 11/2015 | Sasanka | ................ G06F 9/3861 |

(Continued)

OTHER PUBLICATIONS

Dagenais, Michel R., et al. "Software Performance Analysis." arXiv.org, Cornell University, 2005, arxiv.org/ftp/cs/papers/0507/0507073.pdf. Accessed Jun. 19, 2021. (Year: 2005).*

(Continued)

*Primary Examiner* — Wei Y Zhen
*Assistant Examiner* — Binh Luu
(74) *Attorney, Agent, or Firm* — Workman Nydegger

(57) ABSTRACT

Identifying a trace based on wait chain coverage analysis comprises identifying a scenario covered by a plurality of traces, as well as a plurality of scenario phases. Each phase has corresponding phase beginning and ending, and is covered by corresponding trace(s) of the plurality of traces. For each prior instance of each phase, a corresponding wait chain comprising a series of wait operations is identified. After identifying signatures configured to match a subset of wait operations in wait chain(s), at least a signature coverage is calculated over the identified corresponding wait chains. The signature coverage characterizes portions(s) of these wait chains that are matched by the signature(s). Based on calculating the signature coverage, one or more of the plurality of traces are identified as having unknown wait states, based on the identified trace(s) corresponding to a larger amount of uncovered wait chain portions than others of the plurality of traces.

20 Claims, 6 Drawing Sheets

(56) References Cited

U.S. PATENT DOCUMENTS

| | | | | |
|---|---|---|---|---|
| 9,606,901 B1* | 3/2017 | Elgarat | ............... | G06F 11/3672 |
| 9,672,019 B2* | 6/2017 | Sager | ................... | G06F 11/3648 |
| 10,599,551 B2* | 3/2020 | Lu | ....................... | G06F 11/3404 |
| 2007/0101324 A1 | 5/2007 | Lupu et al. | | |

OTHER PUBLICATIONS

Matson, David, "Announcing TraceProcessor Preview 0.1.0", Retrieved From: https://blogs.windows.com/windowsdeveloper/2019/05/09/announcing-traceprocessor-preview-0-1-0/, May 9, 2019, 13 Pages.

"International Search Report & Written Opinion issued in PCT Application No. PCT/US21/029037", dated Aug. 4, 2021, 17 Pages. (MS# 408664-WO-PCT).

Yu, et al., "Comprehending Performance from Real-World Execution Traces: A Device-Driver Case", In Proceedings of the 19th International Conference on Architectural Support for Programming Languages and Operating Systems, Mar. 1, 2014, pp. 193-206.

* cited by examiner

TRACE IDENTIFICATION BASED ON WAIT CHAIN COVERAGE ANALYSIS

BACKGROUND

Many computing processes generate trace data that captures the performance of those computing processes, directly and/or indirectly. This trace data can capture the performance of hardware logic, firmware, and/or software (e.g., executing on a general purpose and/or special purpose processor). For example, various sources of trace data may capture the performance of computer hardware, firmware, and software components beginning at a time that a computer system is powered on, through hardware initialization and an operating system boot sequence, and continuing with execution of software workloads by the operating system. Trace data can include, for example, a record of significant hardware, firmware, and software events; a record of various software components executed; or even a deterministic trace of executing software (i.e., which is usable to faithfully "replay" that software's traced execution).

Often times, traces are used to identify and fix common performance bottlenecks in computing hardware, firmware, and software. For example, developers may identify log events that represent execution delays, and that are frequent or common across a plurality of traces. Thus, developers they can focus developer time on fixing these common performance issues.

BRIEF SUMMARY

While identifying and fixing common computing performance issues is important, in many situations it can also be desirable to identify and fix rarely-occurring computing performance issues. As one example, cloud computing providers often guarantee strict uptime and performance service-level agreements (SLAs), such as "five nines" (i.e., 99.999%) or "six nines" (i.e., 99.9999%) uptime guarantees. Under these SLAs, the cloud computing provider can have only brief amounts of downtime (i.e., 31.5 seconds under six nines, or 5.26 minutes under five nines) each year without breaching the SLA. Under these constraints, cloud computing providers endeavor to highly optimize any system maintenance (e.g., a hardware and/or operating system reboot) that causes downtime. This means identifying and fixing not only common performance bottlenecks, but also identifying and fixing rare performance bottlenecks. For example, even assuming that all common system boot performance issues have been addressed, when the cloud computing provider hosts and maintains tens to hundreds of thousands of servers, the existence of even one rare system boot performance issue has the potential to break an unacceptable number of SLAs when the cloud computing provider performs system maintenance. Using conventional techniques, identifying traces that capture these rare issues (and, thus, identifying those rare issues) is exceedingly difficult and time-consuming.

At least some embodiments described herein perform an automated wait chain-based analysis of trace data in order to identify traces that contain relatively larger durations of unknown wait events. In particular, the embodiments herein identify a computing scenario, such as system initialization/boot, that has a definable beginning and ending point, as well as statistically independent phases of this scenario (i.e., in which the duration of one phase is an independent variable to the duration of another phase). For each phase, the embodiments herein perform a critical path analysis of different traces of that phase (e.g., each trace corresponding to a different execution of the phase across one or more computers). An output of the critical path analysis of a trace is a wait chain, which identifies a chain of wait (i.e., blocking) operations (e.g., thread sleeps, I/O blocks, CPU blocks, etc.) between the beginning of the phase and the ending of the phase. Based on a collection of signatures that match known wait chain patterns (i.e., known/identified performance issues), these embodiments determine a signature coverage over the identified wait chains. Wait chains with a higher degree of signature coverage are considered to have known and/or common performance issues, while wait chains with a lesser degree of signature coverage are considered to have unknown and/or rare performance issues. Thus, the embodiments herein are usable to identify—and trigger an analysis of—traces having wait chains with lesser degrees of signature coverage for further analysis to identify/fix rare performance issues.

In embodiments, signature coverage is also utilized for additional analysis, such as to determine how widespread a newly-identified performance issue is, to validate if a newly-identified performance issue has actually been fixed and properly deployed, or to perform a "worst case scenario" to determine readiness to meet determined SLA goals.

Embodiments are directed to methods, systems, and computer program products that identify a trace based on wait chain coverage analysis. In one or more embodiments, a computer system identifies a computing scenario having a scenario beginning and a scenario ending. The scenario is covered by a plurality of traces corresponding to execution of a plurality of instances of the scenario. The computer system identifies a plurality of scenario phases between the scenario beginning and the scenario ending. Each phase has a corresponding phase beginning and a corresponding phase ending, and is covered by one or more corresponding traces of the plurality of traces. The one or more corresponding traces are usable to identify one or more wait operations that occurred during a prior execution of a prior instance of the phase in connection with execution of a prior instance of the scenario. For each prior instance of each phase, the computer system identifies, based at least on the one or more corresponding traces, a corresponding wait chain comprising a series of wait operations between the corresponding phase beginning and the corresponding phase ending. The computer system identifies one or more signatures, each configured to match a subset of wait operations in one or more wait chains, and calculates one or more coverages, and calculates a signature coverage that characterizes one or more portions of the identified corresponding wait chains that have one or more wait operations that are matched by the one or more signatures. The computer system triggers an analysis of one or more of the plurality of traces as having unknown wait states based on the identified one or more traces corresponding to a larger amount of uncovered wait chain portions than one or more others of the plurality of traces.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein perform an automated wait chain-based analysis of trace data in order to identify traces that contain relatively larger durations of unknown wait events. In particular, the embodiments herein identify a computing scenario, such as system initialization/boot, that has a definable beginning and ending point, as well as statistically independent phases of this scenario (i.e., in which the duration of one phase is an independent variable to the duration of another phase). For each phase, the embodiments herein perform a critical path analysis of different traces of that phase (e.g., each trace corresponding to a different execution of the phase across one or more computers). An output of the critical path analysis of a trace is a wait chain, which identifies a chain of wait (i.e., blocking) operations (e.g., thread sleeps, I/O blocks, CPU blocks, etc.) between the beginning of the phase and the ending of the phase. Based on a collection of signatures that match known wait chain patterns (i.e., known/identified performance issues), these embodiments determine a signature coverage over the identified wait chains. Wait chains with a higher degree of signature coverage are considered to have known and/or common performance issues, while wait chains with a lesser degree of signature coverage are considered to have unknown and/or rare performance issues. Thus, the embodiments herein are usable to identify—and trigger an analysis of—traces having wait chains with lesser degrees of signature coverage for further analysis to identify/fix rare performance issues.

Figure 1A:
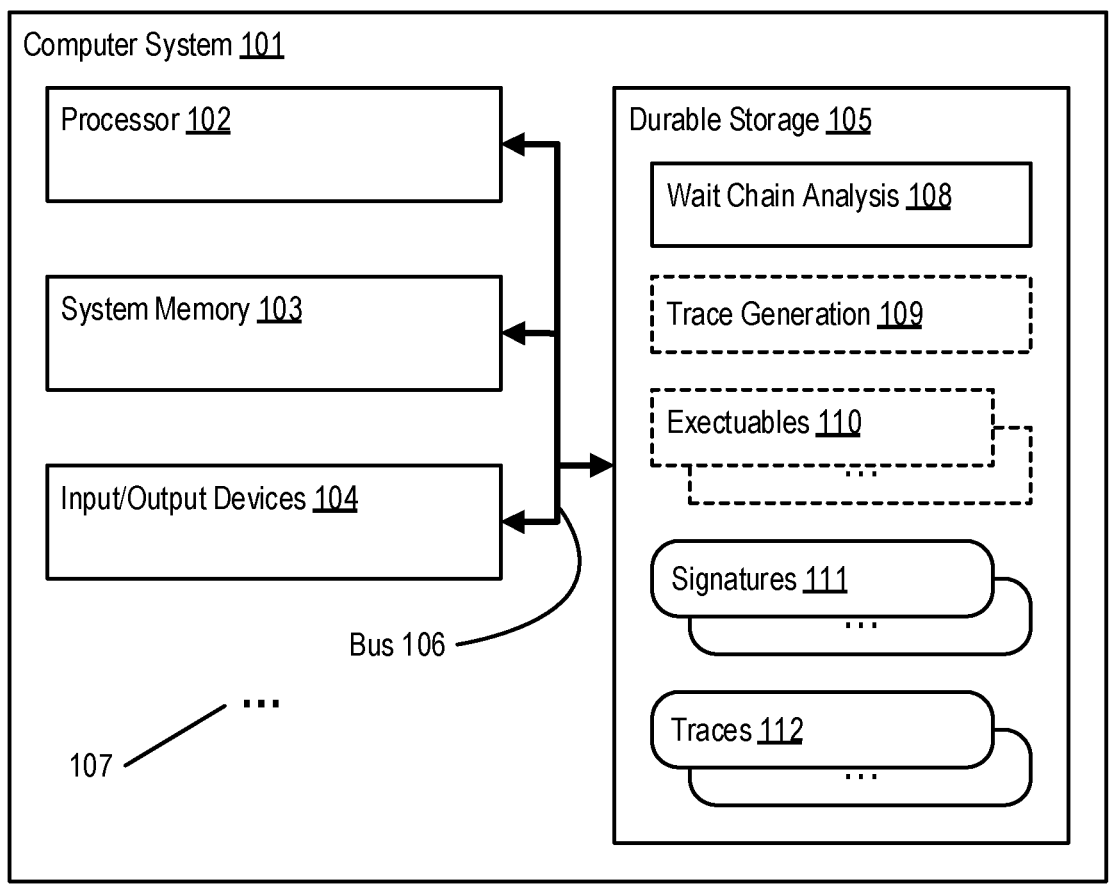
FIG. 1A illustrates an example computer architecture that facilitates identifying a trace based on wait chain coverage analysis.

To the accomplishment of the foregoing, FIG. 1A illustrates an example computer architecture 100 that facilitates identifying a trace based on wait chain coverage analysis. As depicted, the computer architecture 100 comprises or utilizes a computer system 101, which can be special-purpose or general-purpose, and which includes computer hardware, such as, for example, a processor 102 (i.e., or plurality of processors), system memory 103, I/O devices 104, and durable storage 105, which are communicatively coupled using a communications bus 106 (or a plurality of communications buses). As indicated by an ellipsis 107, the computer system 101 can include additional hardware components, as appropriate.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 105) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., I/O devices 104), and then eventually transferred to computer system RAM (e.g., system memory 103) and/or to less volatile computer storage media (e.g., durable storage 105) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As illustrated, the durable storage 105 stores computer-executable instructions and/or data structures representing executable software components; correspondingly, during execution of this software at the processor 102 (or processors), one or more portions of these computer-executable instructions and/or data structures are loaded into system memory 103. For example, the durable storage 105 is shown as potentially storing computer-executable instructions and/or data structures corresponding to a wait chain analysis component 108, a trace generation component 109, and executables 110. The durable storage 105 is also illustrated as storing data, including signatures 111 and traces 112.

If included, the trace generation component 109 generates one or more of the traces 112 based on execution of executables 110 at the processor 102 and/or based on operation of hardware of computer system 101 and/or its associated firmware. While FIG. 1A illustrates only a single trace generation component 109, in embodiments the computer system 101 includes a plurality of trace generation components, such as a different trace generation component for each type of trace in traces 112. The particular form, and information fidelity, of each of the traces 112 may vary by implementation of its corresponding trace generation component. In some embodiments, one or more of the traces 112 comprise events generated by an operating system kernel, such as Event Tracing for Windows (ETW) events, DTrace events, and the like.

Regardless of the particular the type(s) of the traces 112, in embodiments each of the traces 112 comprises a record of, or are usable to identify (e.g., via emulation-based deterministic code replay), information about executing threads—including wait events/operations that occurred during execution of those threads. For example, in some embodiments the traces 112 include a record of, or are usable to identify, one or more of a first call stack of a first thread that initiated a given wait operation, a second call stack of a second thread that terminated the wait operation, a type of the wait operation (e.g., timer, disk I/O, network I/O, CPU busy, etc.), or context information for a thread involved in the wait operation (e.g., an identity of a process to which the thread belongs, command line parameters used to initiate the process, etc.).

Figure 2:
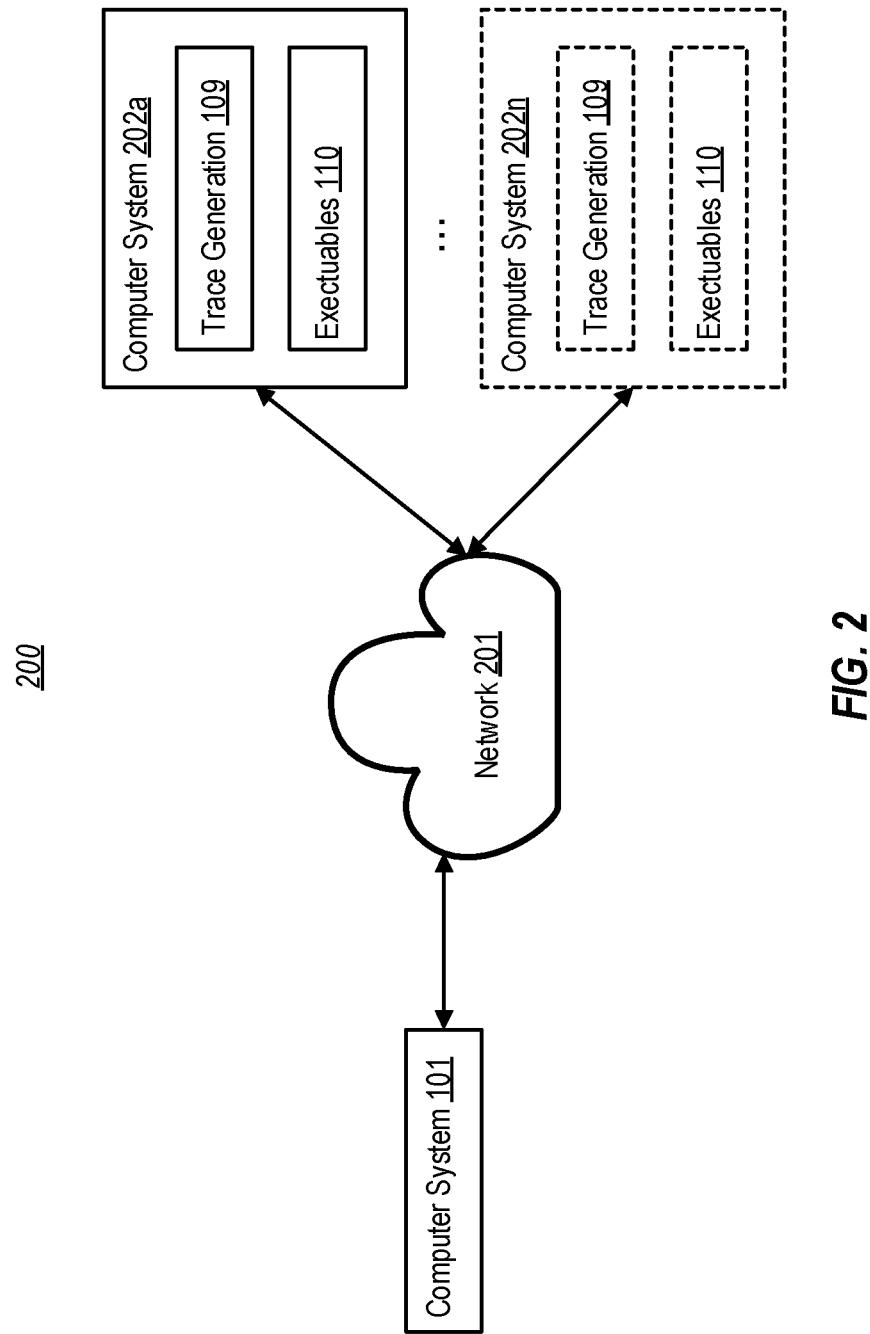
FIG. 2 illustrates an example computing environment in which the computer system of FIG. 1A is connected to one or more other computer systems over one or more networks.

In embodiments, the computer system 101 additionally, or alternatively, receives at least one of the traces 112 from another computer system (e.g., using one or more of the I/O devices 104). For example, FIG. 2 illustrates an example computing environment 200 in which computer system 101 of FIG. 1A is connected to one or more of computer systems 202 (i.e., computer system 202a to computer system 202n) over a network 201 (or a plurality of networks). As shown in FIG. 2, each of the computer systems 202 includes a trace generation component 109 (or a plurality of trace generators for different types of traces) and stores a copy of executables 110. As such, the computer system 101 is enabled to receive, over the network 201, one or more of the traces 112 from one or more of these computer systems 202. In one example, the computing environment 200 is a cloud data center, the computer systems 202 are virtualization hosts, and the computer system 101 receives the traces 112 from these virtualization hosts for analysis by the wait chain analysis component 108.

Each of the signatures 111 is configured to match subsets of one or more wait chains that the wait chain analysis component 108 has produced from the traces 112. For example, each of the signatures 111 could match a single wait event/operation (e.g., thread sleeps, I/O blocks, CPU blocks, etc.) within a given wait chain, or a sequence of two or more wait operations in the wait chain, if appropriate matching wait operations are present in the wait chain. In embodiments, each of the signatures 111 comprises one or more regular expressions and/or one or more conditional statements that are configured to match one or more attributes of one or more wait operations.

In general, the wait chain analysis component 108 provides functionality for performing an automated wait chain-based analysis of trace data in order to identify one or more of the traces 112 that contain relatively larger portions of unknown wait events than one or more others of traces 112. In embodiments unknown wait events are those operations that have not matched to one or more of the signatures 111. With this identification, the wait chain analysis component 108 may perform additional analysis, such as to determine how widespread a newly-identified performance issue is, to validate if a newly-identified performance issue has actually been fixed and properly deployed, or to perform a "worst case scenario" to determine readiness to meet determined SLA goals.

To demonstrate embodiments for how the wait chain analysis component 108 accomplishes the foregoing, FIG. 18 illustrates more particular detail of the wait chain analysis component 108 of FIG. 1A. As depicted, the wait chain analysis component 108 includes a variety of components, including a scenario identification component 113, a phase identification component 114, a critical path extraction component 115, a signature identification component 116, a coverage calculation component 117, and an analysis component 118, that represent various functions that the wait chain analysis component 108 implements in accordance with various embodiments described herein. It will be appreciated that the depicted components—including their identity, sub-components, and arrangement—are presented merely as an aid in describing a particular embodiment of the wait chain analysis component 108 described herein, and that these components are non-limiting to how software and/or hardware might implement various embodiments of the wait chain analysis component 108 described herein, or of the particular functionality thereof.

In embodiments, the scenario identification component 113 identifies a computing scenario having a defined start and a defined end, and one or more instances of which are—at least partially—covered (i.e., logged/recorded) by the traces 112. A computing scenario can comprise any series of operations performed by computer system 101 and/or computer systems 202, such as system boot/initialization, processing a database transaction, performing a computational task, communicating with another computer system, etc. Taking the example of the computing scenario comprising a system boot/initialization, in embodiments the scenario begins with a hardware power on/reset (or a software reset), and ends when an operating system reaches a certain initialization state.

Figure 3A:
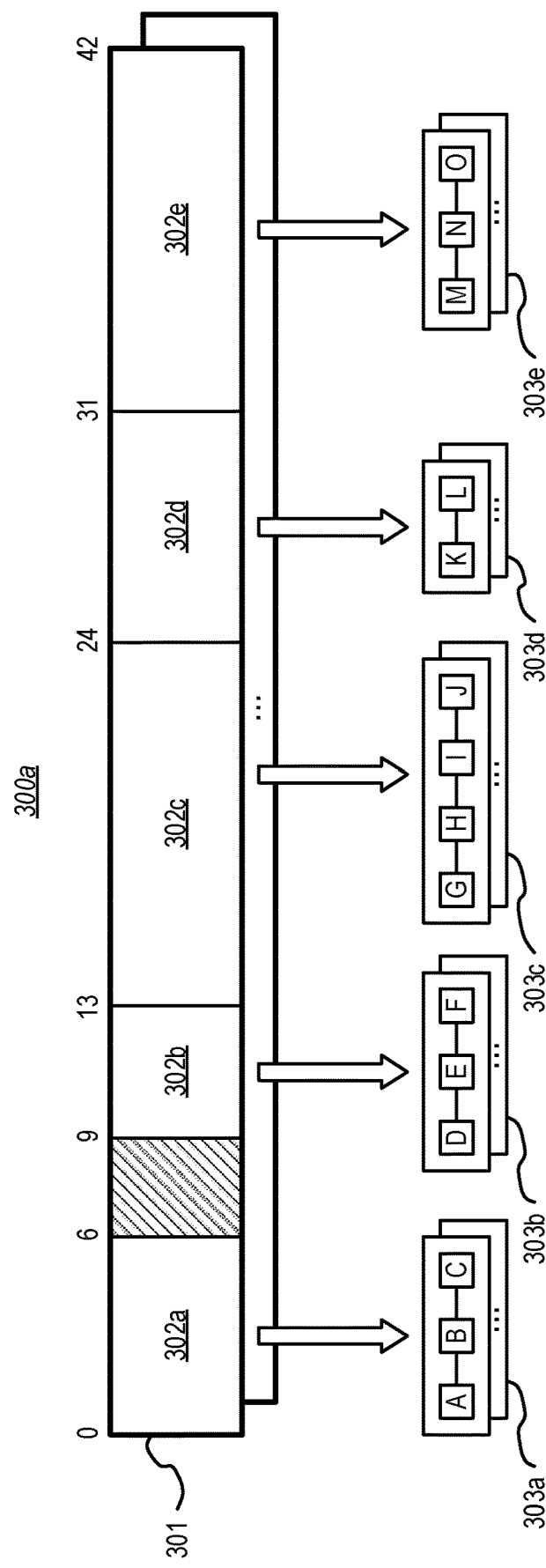
FIGS. 3A and 3B illustrate an example of critical path extraction and wait chain analysis of a computing scenario.

To illustrate, FIG. 3A illustrates an example 300a of critical path extraction and wait chain analysis of a computing scenario, and depicts a plurality of instances of a computing scenario 301, execution of which is recorded in traces 112. As shown, at least one of these instances begins at timestamp zero and ends at timestamp forty-two. In an example, for this instance, timestamp zero corresponds to a timestamp at which a hardware power on/reset (or a software reset) occurred, and timestamp forty-two corresponds to a timestamp at which an operating system reached a fully initialized state. Each instance of computing scenario 301 has the same defined beginning and ending events, although the particular duration of each instance may vary due to different initial environmental conditions, different external inputs, etc.

In embodiments, the phase identification component 114 identifies one or more phases of the computing scenario. As used herein, a phase is a subset of a scenario for which one or more of traces 112 exists, and which is independent of the other phases. For example, returning to the example of the computing scenario comprising a system boot/initialization, in embodiments a first scenario phase corresponds to a low-level hardware and BIOS/EFI initialization, a second phase corresponds a boot loader initialization, a third phase corresponds to initialization of hardware by an operating system, a fourth phase corresponds to loading of system services, etc. Notably, each of these phases is independent of one another. For example, if the low-level hardware and BIOS/EFI initialization of the first phase takes longer than usual due to a memory upgrade, beginning of the second phase of boot loader initialization will be delayed but the actual duration of the boot loader initialization is unaffected by the longer than usual first phase. In embodiments, operation of the phase identification component 114 is optional, in which case the entire computing scenario is considered to be single phase.

In embodiments, identifying different phases of a scenario is useful for segmenting and/or focusing further analysis by the wait chain analysis component 108. For example, the software and/or hardware involved in different phases may be the responsibility of different development teams; may have different fidelities, qualities, or quantities, of trace data available; may be in different developmental stages (e.g., mature, immature, etc.), may have different overall stability, etc. Given these considerations, it may make sense to devote more computing resources to analysis of some phase(s) of a scenario than to other phases (e.g., in terms of gathering trace data, in terms of operation of the wait chain analysis component 108, in terms of development team availability and responsiveness, etc.).

In FIG. 3A, example 300a shows a plurality of phases 302 (i.e., phase 302a to phase 302e) of computing scenario 301. In some embodiments, each instance of the computing scenario 301 has the same phases, though the particular duration of each phase may vary from scenario instance to scenario instance. In embodiments, there may be gaps in trace coverage for one or more scenario instances. For example, as highlighted by diagonal shading, there is a gap between phase 302a and phase 302b (i.e., corresponding to timestamp six to timestamp nine) in at least one instance of computing scenario 301. For example, perhaps no trace data is generated during boot loader initialization. Depending on coverage by traces 112, some instances of computing scenario 301 may have gaps that others do not. Thus, in some embodiments, different instances of the computing scenario 301 may have different subsets of a set of phases. However, for purposes of the example 300a, it is assumed that each instance of computing scenario 301 has a gap between phase 302a and phase 302b.

In embodiments, for each trace of each phase contained in traces 112, the critical path extraction component 115 performs a critical path extraction on the trace to create a wait chain. In one embodiment, beginning at the end of the phase, the critical path extraction component 115 analyzes a given trace of the phase to identify the last wait operation that occurred before the phase ended. Next, the critical path extraction component 115 further analyzes the trace to identify the last wait operation that occurred before the identified wait operation. The critical path extraction component 115 continues this analysis until it reaches the beginning of the trace/phase. As a result of the critical path extraction, the critical path extraction component 115 identifies a sequential chain of wait operations from the trace, which wait operations proceed between the beginning of the phase to the ending of the phase.

In FIG. 3A, example 300a shows a plurality of wait chain sets 303 (i.e., wait chain set 303a to wait chain set 303e) which—as indicated by downward arrows—each corresponds to one phase in phases 302. Each of wait chain sets 303 corresponds to a different trace of a corresponding phase in phases 302. Thus, for example, for at least one trace of phase 302a (i.e., contained in traces 112), the critical path extraction component 115 has extracted a wait chain comprising wait operations A, B, and C; for at least one trace of phase 302b, the critical path extraction component 115 has extracted a wait chain comprising wait operations D, E, and F; and so on to at least one trace of phase 302e and a wait chain comprising wait operations M, N, and O. Notably, in embodiments, different wait chains in a given one of wait chain sets 303 can include a different number and/or identity of wait operations, depending on the data contained in the different traces of the corresponding phase.

In embodiments, the critical path extraction component 115 also identifies, for each identified wait operation, one or more attributes of the wait operation. In embodiments, these attributes include one or more of a first call stack of a first thread that initiated a given wait operation, a second call stack of a second thread that terminated the wait operation, a type of the wait operation (e.g., timer, disk I/O, network I/O, CPU busy, etc.), or context information for a thread involved in the wait operation (e.g., an identity of a process to which the thread belongs, command line parameters used to initiate the process, etc.).

In embodiments, the signature identification component 116 identifies one or more signatures (i.e., signatures 111), each of which is configured to match to a subset of one or more wait operations in a wait chain identified by the critical path extraction component 115. As mentioned, in embodiments, each of the signatures 111 comprises one or more regular expressions and/or one or more conditional statements that are configured to match one or more attributes of one or more wait operations—such as the attributes that were identified by the critical path extraction component 115.

In embodiments, the coverage calculation component 117 calculates one or more "coverages," including at least a signature coverage. In embodiments, the coverage calculation component 117 calculates a signature coverage for each wait chain based on determining how much of each wait chain has wait operations to which at least one of signatures 111 match. As will be appreciated, wait chains having a larger portion of their wait operations to which the signatures 111 match have a larger portion of "known" wait operations than wait chains having a lesser portion of their wait operations to which the signatures 111 match.

Figure 3B:
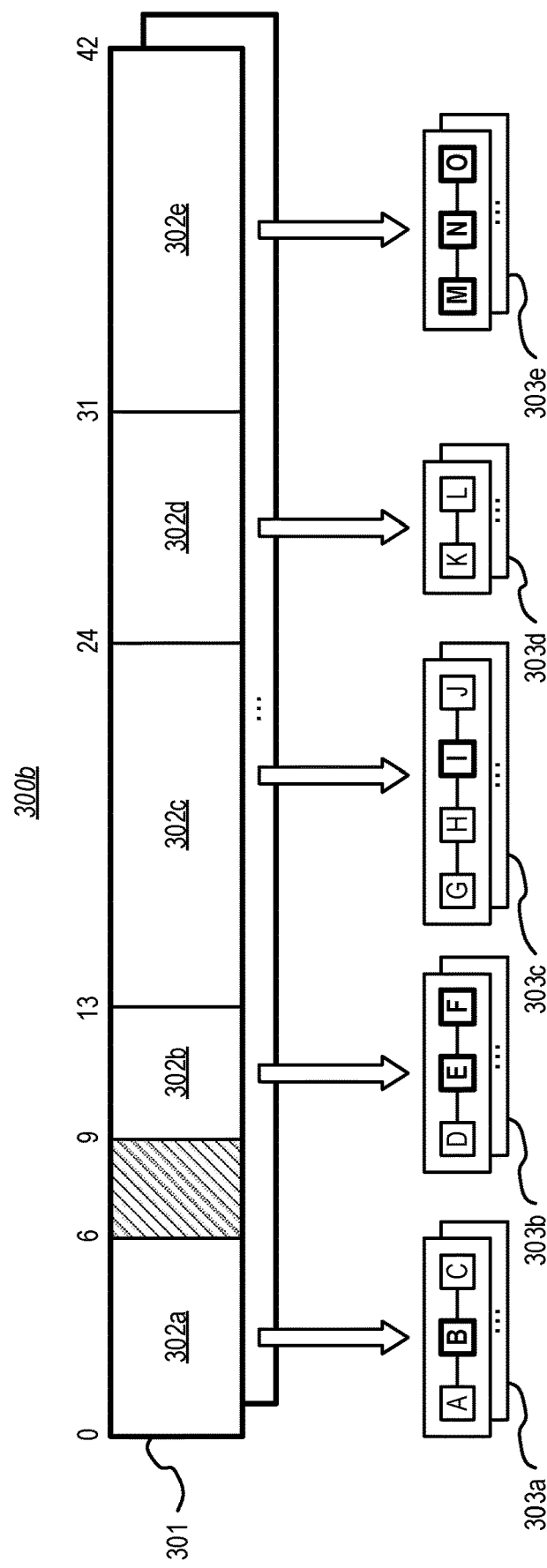

Turning to FIG. 3B, in example 300b shows the wait chains 300 of example 300a now show subsets of wait operations in bold, indicating that the coverage calculation component 117 has matched one or more signatures to those wait operations (either individually or as a group/sequence). Here, the wait operations in the illustrated wait chain within wait chain set 303a are about 33% "covered" by signatures 111, the wait operations in the illustrated wait chain within wait chain set 303b are about 66% "covered" by signatures 111, the wait operations in the illustrated wait chain within wait chain set 303c are 25% "covered" by signatures 111, the wait operations in the illustrated wait chain within wait chain set 303d are 0% "covered" by signatures 111, and the wait operations in the illustrated wait chain within wait chain set 303e are 100% "covered" by signatures 111.

In embodiments, the coverage calculation component 117 also calculates at least one of a phase coverage that characterizes how much of a computing scenario is covered by identified phases, or a wait coverage that characterizes how much of the identified phases have identified corresponding wait chains. For example, in examples 300a/300b, the coverage calculation component 117 might determine that computing scenario 301 has about 92% phase coverage (i.e., accounting for the phase gap between timestamp six and timestamp nine) and that computing scenario 301 has 100% wait coverage (because each phase has a corresponding wait chain set). In embodiments, these additional coverages are used to drive further gathering of traces 112 in order to increase an amount of phase coverage and/or wait coverage (which, in turn, can lead to increased signature coverage).

In embodiments, the analysis component 118 uses at least the coverage calculations by the coverage calculation component 117 to classify and/or direct further analysis of the traces 112. In one embodiment, the analysis component 118 classifies the traces into at least two categories: those corresponding to wait chains having a relatively greater amount of signature coverage, and those corresponding to wait chains having a relatively lesser amount of signature coverage. Since signatures are used to match "known" wait operations (or sequences thereof) within wait chains, then in embodiments this classification is used by the analysis component 118 to identify one or more of the traces 112 that have a relatively lesser amount of signature coverage than one or more others of the traces 112 and, thus, a greater amount of unknown wait operations. Thus, in these embodiments, an output of the analysis component 118 is an identity of one or more of the traces 112 having a greater number, percentage, etc. of unknown wait states than others of the traces 112. In embodiments, having a greater number, percentage, etc. of unknown wait states is interpreted as meaning that these trace(s) may have captured an unknown—and potentially rare—performance issue. Thus, in these embodiments, the output by the analysis component 118 triggers further analysis of these identified trace(s) (e.g., by an automated computer analysis, by a human developer, etc.). As will be appreciated, these embodiments can be extremely useful for focusing resources—whether they be computer hardware or human—to analysis of a potentially small subset of the traces 112 that have captured delays (wait operations) that are not from known issues.

In some embodiments, after having triggered the further analysis of the identified trace(s), the analysis component 118 re-runs one or more of the critical path extraction component 115, the signature identification component 116, or the coverage calculation component 117 in view of one or more new signatures that are added to signatures 111 as a result of the triggered analysis of the identified trace(s). In some embodiments, the analysis component 118 analyzes coverage of these new signature(s) against the existing corpus of traces 112 to determine how widespread a newly-identified performance issue is in these traces 112, which is helpful for providing a data-driven decision for triage (e.g., to prioritize fixing/mitigating a bug). In other embodiments, the analysis component 118 analyzes coverage of these new signature(s) against newly generated traces 112 to validate if a newly-identified performance issue has actually been fixed and properly deployed, identify a later regression of the performance issue, etc.

In some embodiments, the analysis component 118 uses the data generated by the coverage calculation component 117 to perform a "worst case scenario" analysis that determines if one or more scenario goals would be met using only uncovered wait chain durations. For example, a scenario may be associated with an SLA, such as five nines, six nines, etc. uptime guarantees, thereby driving scenario or phase goals for a maximum amount of time that the scenario/phase can take to execute. In embodiments, the analysis component 118 identifies which portion(s) of the traces 112 correspond to wait chain sections that are covered by the signatures 111 (i.e., covered duration), and which portion(s) of the traces 112 correspond to wait chain section that are not covered by the signatures 111 (i.e., uncovered duration). The analysis component 118 then considers only the uncovered durations of these traces (i.e., assuming that all known performance issues matched by the signatures 111 are, or will, be addressed), and determines if the uncovered duration would be sufficient to meet one or more performance goals.

Figure 1B:
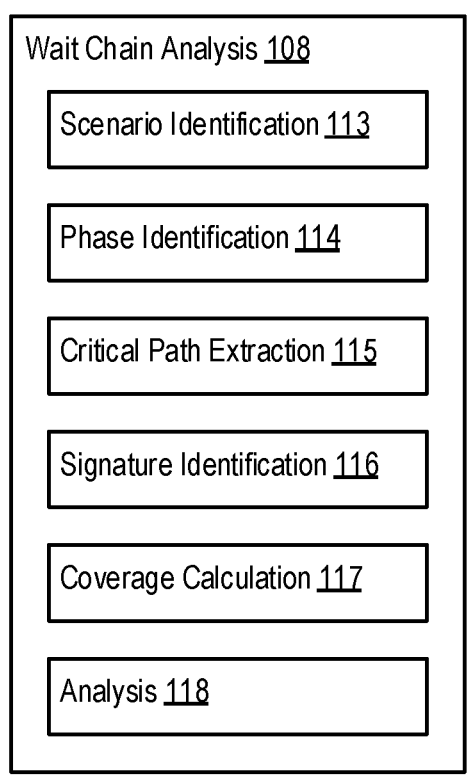
FIG. 1B illustrates an example wait chain analysis component that performs an automated wait chain-based analysis of trace data in order to identify one or more traces that contain relatively larger portions of unknown wait events than one or more other traces.
Figure 4:
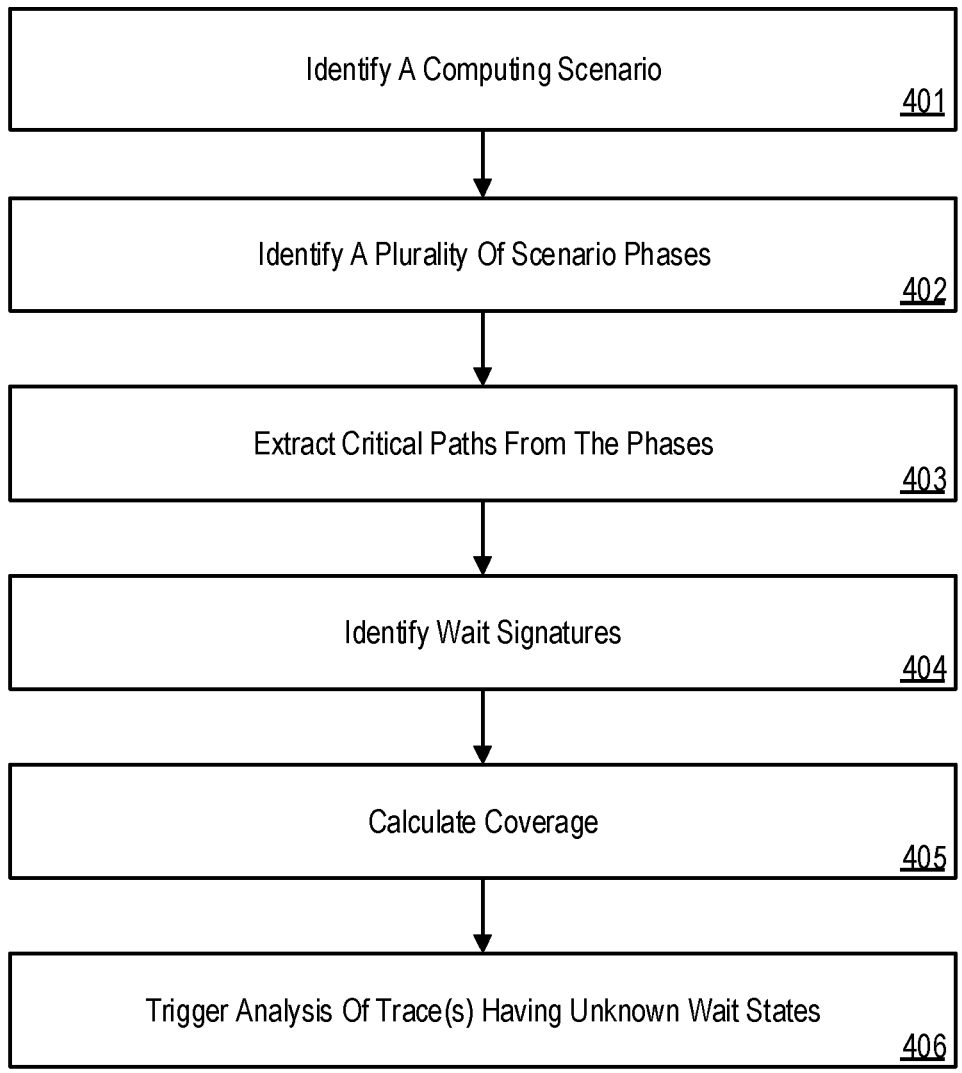
FIG. 4 illustrates a flow chart of an example method for identifying a trace based on wait chain coverage analysis.

A more particular description of operation of the wait chain analysis component 108 is now given in connection with FIG. 4, which illustrates a flow chart of an example method 400 for identifying a trace based on wait chain coverage analysis. Method 400 will be described with respect to the components and data of computer architecture 100, with particular focus on the wait chain analysis component 108 of FIG. 1B, as well as with respect to the examples 300a/300b of critical path extraction and wait chain analysis of a computing scenario as illustrated in FIGS. 3A and 3B. Although the acts of method 400 may be discussed in a certain order or may be illustrated in a flow chart as occurring in a particular order, no particular ordering is required unless specifically stated, or required because an act is dependent on another act being completed prior to the act being performed.

As shown in FIG. 4, method 400 comprises an act 401 of identifying a computing scenario. In embodiments, act 401 includes identifying a computing scenario having a scenario beginning and a scenario ending, the scenario being covered by a plurality of traces corresponding to execution of a plurality of instances of the scenario. In an example, the scenario identification component 113 identifies computing scenario 301. In embodiments, the scenario identification component 113 makes this identification based on user input, based on analysis of traces 112, etc.

Method 400 also comprises an act 402 of identifying a plurality of scenario phases. In embodiments, act 402 includes identifying a plurality of scenario phases between the scenario beginning and the scenario ending, each phase having a corresponding phase beginning and a corresponding phase ending, each phase being covered by one or more corresponding traces of the plurality of traces, the one or more corresponding traces being usable to identify one or more wait operations that occurred during a prior execution of a prior instance of the phase in connection with execution of a prior instance of the scenario. Continuing the foregoing example, the phase identification component 114 identifies phases 302 from the computing scenario 301 identified in act 401. In embodiments, the phase identification component 114 makes this identification based on user input, based on analysis of traces 112, etc.

As discussed, in embodiments, each phase is independent of one another—such that the duration of one phase does not affect the duration of another phase. Thus, in some embodiments of act 402, a duration of each phase in the plurality of phases is independent from a duration of each other phase in the plurality of phases.

Method 400 also comprises an act 403 of extracting critical paths from the phases. In embodiments, act 403 includes, for each prior instance of each phase, identifying, based at least on the one or more corresponding traces, a corresponding wait chain comprising a series of wait operations between the corresponding phase beginning and the corresponding phase ending. Still continuing the example, for each of phases 302, the critical path extraction component 115 analyzes one or more corresponding traces of that phase from traces 112. Based at least on these traces, the critical path extraction component 115 identifies a wait chain set characterizing the wait operations identified from the trace. Thus, in the context of examples 300a/300b, the critical path extraction component 115 identifies wait chain set 303a for phase 302a, wait chain set 303b for phase 302b, etc.

As discussed, in embodiments, the critical path extraction component 115 also identifies one or more attributes of each wait operation, such as one or more of a first call stack of a first thread that initiated a given wait operation, a second call stack of a second thread that terminated the wait operation, a type of the wait operation, or context information for a thread involved in the wait operation. Thus, in some embodiments of act 403, identifying each corresponding wait chain comprises identifying, for each wait operation in the wait chain, one or more attributes of the wait operation, including identifying one or more of (i) a first call stack of a first thread that initiated the wait operation, (ii) a second call stack of a second thread that terminated the wait operation, (iii) a type of the wait operation, or (iv) thread context information.

Method 400 also comprises an act 404 of identifying wait signatures. In embodiments, act 404 includes identifying one or more signatures, each signature configured to match a subset of wait operations in one or more wait chains. Still continuing the example, the signature identification component 116 identifies signatures 111 which, in embodiments, comprises one or more regular expressions and/or one or more conditional statements that are configured to match attributes of one or more wait operations in the wait chain sets 303 that were identified by the critical path extraction component 115. Thus, in some embodiments of act 404, each signature comprises at least one of (i) one or more regular expressions that are configured to match attributes of one or more wait operations, or (ii) one or more conditions that are configured to match attributes of one or more wait operations. Furthermore, in some embodiments of act 404, each signature is configured to match a subset of wait operations in one or more wait chains based on matching one or more of (i) a sequence of call stacks that lead to a particular wait, (ii) a sequence of call stacks that terminated the particular wait, or (iii) a type of the particular wait.

Method 400 also comprises an act 405 of calculating coverage. In embodiments, act 405 includes calculating one or more coverages, including calculating a signature coverage that characterizes one or more portions of the identified corresponding wait chains that have one or more wait operations that are matched by the one or more signatures. Still continuing the example, the coverage calculation component 117 calculates one or more coverages, including calculating a signature coverage based on matching the signatures 111 accessed in act 404 to the wait chain sets 303 extracted in act 403. In embodiments, the signature coverage of a given wait chain is calculated based on a percentage of total wait operations in the wait chain to which at least one signature matches (or, in the inverse, a percentage of total wait operations in the wait chain to which at least one signature does not match). However, other embodiments quantify coverage in other ways, such as an absolute number of matching or non-matching wait operations in each wait chain.

As discussed, in some embodiments the coverage calculation component 117 also calculates at least one of a phase coverage that characterizes how much of a computing scenario is covered by identified phases, or a wait coverage that characterizes how much of the identified phases have identified corresponding wait chains. Thus, in some embodiments of act 405, calculating the one or more coverages includes calculating at least one of (i) a phase coverage that characterizes how much of the computing scenario is covered by the plurality of phases, or (ii) a wait coverage that characterizes how much of the plurality of phases have identified corresponding wait chains.

Method 400 also comprises an act 406 of triggering analysis of trace(s) having unknown wait states. In embodiments, act 406 includes based on calculating the one or more coverages, triggering an analysis of one or more of the plurality of traces as having unknown wait states based on the identified one or more traces corresponding to a larger amount of uncovered wait chain portions than one or more others of the plurality of traces. Still continuing the example, the analysis component 118 uses the coverages illustrated in example 300b (and computed by the coverage calculation component 117) to identify at least one of traces 112 that has a lesser amount of signature coverage by signatures 111, and to trigger a further analysis of that trace (e.g., by a computer and/or by a human). In one particular example, the analysis component 118 identifies, and triggers analysis of, a first trace corresponding to the illustrated wait chain in wait chain set 303d, since that wait chain has the lowest percent (i.e., 0%) of signature coverage. In another particular example, the analysis component 118 identifies, and triggers analysis of, a second trace corresponding to the illustrated wait chain in wait chain set 303c, since that wait chain has a greatest number (i.e., three) of uncovered wait operations.

As mentioned, triggering the analysis of one or more of the of traces may result in one or more additions to the signatures 111, and that the analysis component 118 may use these new signature(s) against existing traces 112 to determine how widespread a newly-identified performance issue was, or may use these new signatures against new traces 112 validate if a newly-identified performance issue has actually been fixed and properly deployed in, to identify a later regression of the performance issue, etc. Thus, in some embodiments, method 400 also comprises identifying a signature that matches at least one of the unknown wait states, and determining at least one of (i) whether the signature matches at least one of the plurality of traces, or (ii) whether the signature matches at least one additional trace not in the plurality of traces.

As also mentioned, the analysis component 118 may utilize the data generated by the coverage calculation component 117 to perform a "worst case scenario" analysis that determines if one or more scenario goals would be met using only uncovered wait chain durations. Thus, in some embodiments, method 400 comprises, based on calculating the one or more coverages, determine if one or more scenario goals would be met using only uncovered durations.

Accordingly, the embodiments described herein perform an automated wait chain-based analysis of trace data in order to identify traces that contain relatively larger durations unknown wait events. These embodiments identify a computing scenario that has a definable beginning and ending, as well as statistically independent phases of this scenario (i.e., in which the duration of one phase is an independent variable to the duration of another phase). For each phase, the embodiments herein perform a critical path analysis of different traces of that phase (e.g., each trace corresponding to a different execution of the phase across one or more computers). An output of the critical path analysis of a trace is a wait chain, which identifies a chain of wait operations between the beginning of the phase and the ending of the phase. Based on a collection of signatures that match known wait chain patterns (i.e., known/identified performance issues), these embodiments determine a signature coverage over the identified wait chains. Wait chains with a higher degree of signature coverage are considered to have known and/or common performance issues, while wait chains with a lesser degree of signature coverage are considered to have unknown and/or rare performance issues. Thus, the embodiments herein are usable to identify—and trigger an analysis of—traces having wait chains with lesser degrees of signature coverage for further analysis to identify/fix rare performance issues.

In embodiments, signature coverage is also utilized for additional analysis, such as to determine how widespread a newly-identified performance issue is, to validate if a newly-identified performance issue has actually been fixed and properly deployed, or to perform a "worst case scenario" to determine readiness to meet determined SLA goals.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A computer system comprising:
  at least one processor; and
  at least one computer-readable medium having stored thereon computer-executable instructions that are executable by the at least one processor to cause the computer system to identify a trace based on wait chain coverage analysis, the computer-executable instructions including instructions that are executable by the at least one processor to cause the computer system to perform at least the following:
    identify a computing scenario having a scenario beginning and a scenario ending, the scenario being covered by a plurality of traces corresponding to execution of a plurality of instances of the scenario;
    identify a plurality of scenario phases between the scenario beginning and the scenario ending, each phase having a corresponding phase beginning and a corresponding phase ending, each phase being covered by one or more corresponding traces of the plurality of traces, the one or more corresponding traces being usable to identify one or more wait operations that occurred during a prior execution of a prior instance of the phase in connection with execution of a prior instance of the scenario;

for each prior instance of each phase, identify, based at least on the one or more corresponding traces, a corresponding wait chain comprising a series of wait operations between the corresponding phase beginning and the corresponding phase ending;

identify one or more signatures, each signature configured to match a subset of wait operations in one or more wait chains;

calculate one or more coverages, including calculating a signature coverage that characterizes one or more portions of the identified corresponding wait chains that have one or more wait operations that are matched by the one or more signatures; and based on calculating the one or more coverages, trigger an analysis of one or more of the plurality of traces as having unknown wait states based on the identified one or more traces corresponding to a larger amount of uncovered wait chain portions than one or more others of the plurality of traces.

2. The computer system of claim 1, wherein identifying each corresponding wait chain comprises identifying, for each wait operation in the wait chain, one or more attributes of the wait operation, including identifying one or more of
(i) a first call stack of a first thread that initiated the wait operation,
(ii) a second call stack of a second thread that terminated the wait operation,
(iii) a type of the wait operation, or (iv) thread context information.

3. The computer system of claim 1, wherein each signature comprises at least one of
(i) one or more regular expressions that are configured to match attributes of one or more wait operations, or
(ii) one or more conditions that are configured to match attributes of one or more wait operations.

4. The computer system of claim 1, the computer-executable instructions also including instructions that are executable by the at least one processor to cause the computer system to, based on calculating the one or more coverages, determine if one or more scenario goals would be met using only uncovered durations.

5. The computer system of claim 1, wherein calculating the one or more coverages includes calculating a phase coverage that characterizes how much of the computing scenario is covered by the plurality of phases.

6. The computer system of claim 1, wherein calculating one or more coverages includes calculating a wait coverage that characterizes how much of the plurality of phases have identified corresponding wait chains.

7. The computer system of claim 1, wherein a duration of each phase in the plurality of phases is independent from a duration of each other phase in the plurality of phases.

8. The computer system of claim 1, wherein each signature is configured to match a subset of wait operations in one or more wait chains based on matching one or more of
(i) a sequence of call stacks that lead to a particular wait,
(ii) a sequence of call stacks that terminated the particular wait, or
(iii) a type of the particular wait.

9. The computer system of claim 1, the computer-executable instructions also including instructions that are executable by the at least one processor to cause the computer system to:
identify a signature that matches at least one of the unknown wait states; and
determine at least one of (i) whether the signature matches at least one of the plurality of traces, or
(ii) whether the signature matches at least one additional trace not in the plurality of traces.

10. A method, implemented at a computer system that includes at least one processor, for trace identification based on wait chain coverage analysis, the method comprising:
identifying a computing scenario having a scenario beginning and a scenario ending, the scenario being covered by a plurality of traces corresponding to execution of a plurality of instances of the scenario;

identifying a plurality of scenario phases between the scenario beginning and the scenario ending, each phase having a corresponding phase beginning and a corresponding phase ending, each phase being covered by one or more corresponding traces of the plurality of traces, the one or more corresponding traces being usable to identify one or more wait operations that occurred during a prior execution of a prior instance of the phase in connection with execution of a prior instance of the scenario;

for each prior instance of each phase, identifying, based at least on the one or more corresponding traces, a corresponding wait chain comprising a series of wait operations between the corresponding phase beginning and the corresponding phase ending;

identifying one or more signatures, each signature configured to match a subset of wait operations in one or more wait chains;

calculating one or more coverages, including calculating a signature coverage that characterizes one or more portions of the identified corresponding wait chains that have one or more wait operations that are matched by the one or more signatures; and based on calculating the one or more coverages, triggering an analysis of one or more of the plurality of traces as having unknown wait states based on the identified one or more traces corresponding to a larger amount of uncovered wait chain portions than one or more others of the plurality of traces.

11. The method of claim 10, wherein identifying each corresponding wait chain comprises identifying, for each wait operation in the wait chain, one or more attributes of the wait operation, including identifying one or more of
(i) a first call stack of a first thread that initiated the wait operation,
(ii) a second call stack of a second thread that terminated the wait operation,
(iii) a type of the wait operation, or
(iv) thread context information.

12. The method of claim 10, wherein each signature comprises at least one of
(i) one or more regular expressions that are configured to match attributes of one or more wait operations, or
(ii) one or more conditions that are configured to match attributes of one or more wait operations.

13. The method of claim 10, further comprising, based on calculating the one or more coverages, determining if one or more scenario goals would be met using only uncovered durations.

14. The method of claim 10, wherein calculating the one or more coverages includes calculating a phase coverage that characterizes how much of the computing scenario is covered by the plurality of phases.

15. The method of claim 10, wherein calculating one or more coverages includes calculating a wait coverage that characterizes how much of the plurality of phases have identified corresponding wait chains.

16. The method of claim 10, wherein a duration of each phase in the plurality of phases is independent from a duration of each other phase in the plurality of phases.

17. The method of claim 10, wherein each signature is configured to match a subset of wait operations in one or more wait chains based on matching one or more of
    (i) a sequence of call stacks that lead to a particular wait,
    (ii) a sequence of call stacks that terminated the particular wait, or
    (iii) a type of the particular wait.

18. The method of claim 10, further comprising:
    identifying a signature that matches at least one of the unknown wait states; and
    determining at least one of
        (i) whether the signature matches at least one of the plurality of traces, or
        (ii) whether the signature matches at least one additional trace not in the plurality of traces.

19. A computer program product comprising at least one hardware storage device having stored thereon computer-executable instructions that are executable by at least one processor to cause a computer system to identify a trace based on wait chain coverage analysis, the computer-executable instructions including instructions that are executable by the at least one processor to cause the computer system to perform at least the following:
    identify a computing scenario having a scenario beginning and a scenario ending, the scenario being covered by a plurality of traces corresponding to execution of a plurality of instances of the scenario;
    identify a plurality of scenario phases between the scenario beginning and the scenario ending, each phase having a corresponding phase beginning and a corresponding phase ending, each phase being covered by one or more corresponding traces of the plurality of traces, the one or more corresponding traces being usable to identify one or more wait operations that occurred during a prior execution of a prior instance of the phase in connection with execution of a prior instance of the scenario;
    for each prior instance of each phase, identify, based at least on the one or more corresponding traces, a corresponding wait chain comprising a series of wait operations between the corresponding phase beginning and the corresponding phase ending;
    identify one or more signatures, each signature configured to match a subset of wait operations in one or more wait chains;
    calculate one or more coverages, including calculating a signature coverage that characterizes one or more portions of the identified corresponding wait chains that have one or more wait operations that are matched by the one or more signatures; and
    based on calculating the one or more coverages, triggering an analysis of one or more of the plurality of traces as having unknown wait states based on the identified one or more traces corresponding to a larger amount of uncovered wait chain portions than one or more others of the plurality of traces.

20. The computer program product of claim 19, the computer-executable instructions also including instructions that are executable by the at least one processor to cause the computer system to:
    based on having identified the one or more of the plurality of traces as having unknown wait states, subsequently identify a signature that matches at least one of the unknown wait states; and
    determine at least one of
        (i) whether the signature matches at least one of the plurality of traces, or
        (ii) whether the signature matches at least one additional trace not in the plurality of traces.

* * * * *